US010435970B2

(12) United States Patent
Xu et al.

(10) Patent No.: US 10,435,970 B2
(45) Date of Patent: Oct. 8, 2019

(54) ANCHOR AND SEAL SYSTEM

(71) Applicants: Yingqing Xu, Tomball, TX (US); Jason M. Harper, Cypress, TX (US); Barbara A. Pratt, Pearland, TX (US)

(72) Inventors: Yingqing Xu, Tomball, TX (US); Jason M. Harper, Cypress, TX (US); Barbara A. Pratt, Pearland, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 253 days.

(21) Appl. No.: 15/294,306

(22) Filed: Oct. 14, 2016

(65) Prior Publication Data

US 2018/0106119 A1 Apr. 19, 2018

(51) Int. Cl.

| | |
|---|---|
| *E21B 23/01* | (2006.01) |
| *E21B 33/12* | (2006.01) |
| *E21B 33/129* | (2006.01) |
| *E21B 43/26* | (2006.01) |
| *F16J 15/02* | (2006.01) |
| *E21B 33/128* | (2006.01) |
| *E21B 33/1295* | (2006.01) |

(52) U.S. Cl.
CPC .............. *E21B 23/01* (2013.01); *E21B 33/12* (2013.01); *E21B 33/1285* (2013.01); *E21B 33/1293* (2013.01); *E21B 33/1295* (2013.01); *E21B 43/26* (2013.01); *F16J 15/022* (2013.01)

(58) Field of Classification Search
CPC .... E21B 33/1216; E21B 33/134; E21B 23/01; E21B 33/12; E21B 33/128; E21B 33/129; E21B 33/1291; E21B 33/1293
See application file for complete search history.

(56) References Cited

U.S. PATENT DOCUMENTS

| | | | | |
|---|---|---|---|---|
| 2,230,712 A | * | 2/1941 | Bendeler | E21B 33/128 166/123 |
| 2,546,377 A | * | 3/1951 | Turechek | E21B 33/1293 166/134 |
| 6,793,022 B2 | * | 9/2004 | Vick | E21B 33/1208 166/118 |
| 7,168,494 B2 | * | 1/2007 | Starr | E21B 33/12 166/192 |
| 7,350,582 B2 | * | 4/2008 | McKeachnie | E21B 33/1294 166/194 |

(Continued)

FOREIGN PATENT DOCUMENTS

| | | |
|---|---|---|
| WO | 2013169416 A1 | 11/2013 |
| WO | WO-2018071122 A1 * | 4/2018 ............. E21B 23/01 |

OTHER PUBLICATIONS

Notification of Transmittal of the International Search Report and the Written Opinion of the International Searching Authority, or the Declaration; PCT/US2017/051131; dated Dec. 22, 2017; 12 pages.

*Primary Examiner* — Daniel P Stephenson
(74) *Attorney, Agent, or Firm* — Cantor Colburn LLP

(57) ABSTRACT

An anchor and seal system including a slip, a cone in radially expanding communication with the slip, an element in loadable communication with the cone, and a pusher configured to radially displace the element to reside on an element retention surface of the pusher. A method for treating a borehole including running an anchor and seal system above to depth, activating a setting arrangement to anchor and seal the anchor and seal system.

13 Claims, 2 Drawing Sheets

(56) References Cited

U.S. PATENT DOCUMENTS

| | | | |
|---|---|---|---|
| 8,997,859 B1* | 4/2015 | Ackermann | E21B 33/134 166/242.8 |
| 9,574,415 B2* | 2/2017 | Xu | C22C 1/0408 |
| 9,624,751 B2* | 4/2017 | Hern | E21B 23/01 |
| 9,683,423 B2* | 6/2017 | Xu | E21B 33/1208 |
| 9,896,899 B2* | 2/2018 | Davies | E21B 33/1208 |
| 9,970,256 B2* | 5/2018 | Davies | E21B 33/1292 |
| 10,036,221 B2* | 7/2018 | Davies | E21B 23/01 |
| 2010/0326650 A1* | 12/2010 | Tran | E21B 33/134 166/191 |
| 2012/0217025 A1* | 8/2012 | Shkurti | E21B 33/1216 166/387 |
| 2013/0186616 A1* | 7/2013 | Xu | E21B 33/129 166/212 |
| 2013/0299192 A1* | 11/2013 | Xu | E21B 23/01 166/382 |
| 2014/0041857 A1* | 2/2014 | Xu | E21B 33/128 166/118 |
| 2015/0060085 A1* | 3/2015 | Xu | E21B 33/12 166/376 |
| 2015/0129215 A1* | 5/2015 | Xu | C22C 1/0408 166/285 |
| 2015/0129239 A1* | 5/2015 | Richard | E21B 23/06 166/377 |
| 2015/0152724 A1 | 6/2015 | Amendt et al. | |
| 2015/0300121 A1* | 10/2015 | Xu | E21B 33/1208 166/118 |
| 2016/0123100 A1* | 5/2016 | Tse | E21B 23/06 166/387 |
| 2017/0131192 A1 | 5/2017 | Perez et al. | |
| 2018/0106119 A1* | 4/2018 | Xu | E21B 23/01 |

* cited by examiner

ANCHOR AND SEAL SYSTEM

BACKGROUND

The use of seals and the setting of those seals is a staple of operations in the downhole industry. It is necessary for control and optimization of resource recovery among other things. Seals are used and set in different stages of the creation of a well for varying purposes along the way. The many different and distinct needs require many different and distinct arrangements. A plethora of seals and means and methods for setting them exist within the art but as the art evolves, and different types of constructions are created for enhanced resource recovery, more and different seals and setting arrangements are yet needed. Further, in times when profitability in the industry is under pressure, industry providers seek ways to reduce costs for the manufacture of tools. Accordingly, the industry is always receptive to new tools, constructions and cost savings.

BRIEF DESCRIPTION

An anchor and seal system including a slip, a cone in radially expanding communication with the slip, an element in loadable communication with the cone, and a pusher configured to radially displace the element to reside on an element retention surface of the pusher.

A borehole system including a tubular string, an anchor and seal system including a slip, a cone in radially expanding communication with the slip, an element in loadable communication with the cone, and a pusher configured to radially displace the element to reside on an element retention surface of the pusher.

An anchor and seal system including a slip, a cone in radially expanding communication with the slip, an element in loadable communication with the cone, a backup between the cone and the element, and a pusher configured to radially displace the element to reside on an element retention surface of the pusher which presents the element for loaded contact between the pusher and a separate tubular when the element is disposed on the element retention surface.

A method for treating a borehole including running an anchor and seal system described above to depth, activating a setting arrangement to anchor and seal the anchor and seal system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
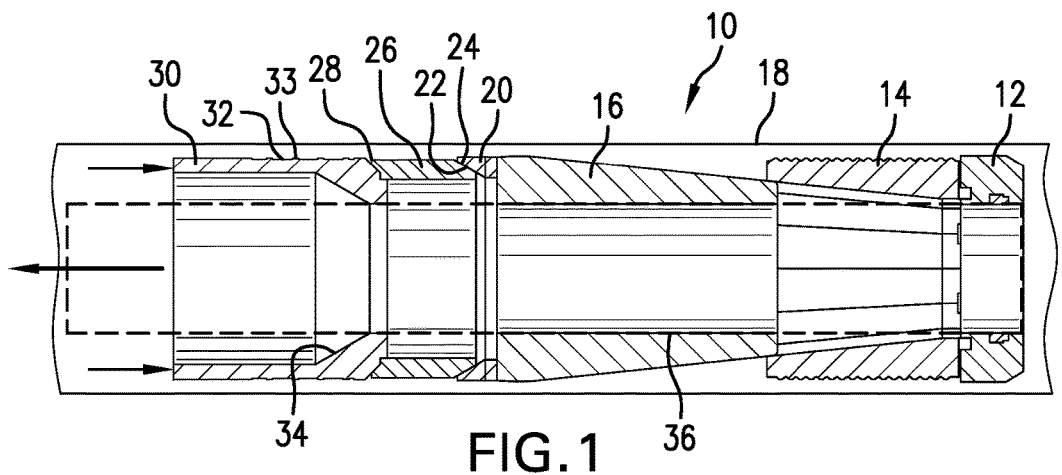
FIG. 1 is a cross sectional schematic view of an anchor and seal system in a run in condition.

Referring to FIG. 1, an anchor and seal system 10 employs fewer components than tools of the prior art that have similar ultimate purpose. More specifically, several common components of the prior art are unnecessary in the configurations disclosed herein. There is no body lock ring, no body to interact with the body lock ring and no backup ring on one side of the element. The avoidance of these components reduces costs substantially and yet in the embodiments disclosed herein, the anchor and seal are fully functional and reliable.

For ease of discussion the components of the embodiments hereof are introduced first followed by a discussion of their interactions and resulting functional attributes. The system 10 includes a bottom sub 12 and a slip 14 that is interactive with a cone 16. Movement of the slip 14 axially relative to the cone 16 causes the slip 14 to move radially outwardly into contact with and into anchoring communication with a tubular 18, which may be a borehole or casing depending upon whether the anchor and seal are to be set in open hole or inside another installed tubular structure, for example. Adjacent the cone 16 is a backup ring 20.

In one embodiment the backup ring is configured as a helically cut piece of tubing such that radial impetus can relatively easily cause an increase in the overall diameter of the ring but yet no gaps are created like they would be if a C ring were used. The helical cut allows the easy material expansion while preventing the development of a gap. The backup ring 20 includes an angled surface 22 configured to interact with a like angled element chamfer surface 24 of an element 26 (that may be a polymer and may be an elastomer) and also, during use, is configured to interact with another like angled pusher surface 28.

A pusher 30 is disposed adjacent the element 26. Pusher 30 includes an element retention surface 32 that presents the element 26 for loaded contact between the pusher 30 and the tubular 18 when the element 26 is disposed on the element retention surface. The pusher 30 in some embodiments also includes a plug seat 34. It is to be appreciated that the backup ring 20 is only discussed on one axial end of the element 26. This is significant in that no backup ring is needed on the other axial end of the element 26. All of the foregoing is disposed for run in and setting on a running and setting arrangement 36 such as a wireline adapter kit (WLAK) illustrated schematically in broken lines. The WLAK is a standard commercially available device that is used to transport and set the system disclosed herein. No discussion or particular illustration of its components is needed.

Upon running the system 10 to target depth in a tubular or borehole 18, the WLAK 36 is activated to impose a shortening telescopic impetus on the components of the system 10. More particularly, the bottom sub 12 is maintained in position by a portion of the WLAK in a known manner while the pusher 30 is urged toward the bottom sub by another portion of the WLAK. As will be appreciated by one of ordinary skill the force being applied to the cone 16 must be borne through the element 26 and the backup ring 20 sufficiently to set the slip 14. This may be force that is transferred entirely before the element begins to move radially outwardly onto the pusher 30 or may be delivered while the element is beginning to deform radially outwardly onto the pusher 30.

It is to be noted however, that in one embodiment, the slips 14 should be fully set before the element 26 contacts the tubular 18 so that a sliding movement of the element 26 on tubular 18 does not occur during the setting operation. This will reduce frictional degradation of the element 26. By the force transmitted to the cone 16 through the components noted above, the cone 16 is urged into the slip 14 thereby causing the slip 14 to move radially outwardly until they contact and bite into the tubular 18.

Figure 2:
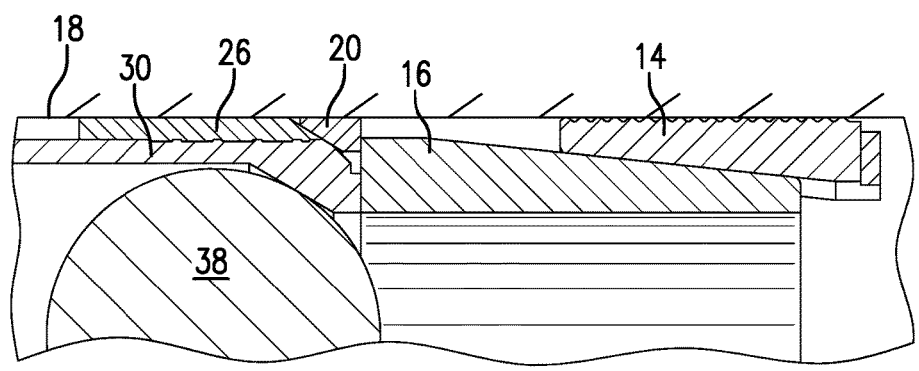
FIG. 2 is an enlarged view of a portion of FIG. 1 in a set condition.

Once the slips 14 have bitten into the tubular 18 the anchor portion (bottom sub 12, slip 14 and cone 16) is set. Continued force on the pusher 30 after the anchor portion is set causes the element 26 to ride up on the pusher 30 or ride further up on the pusher 30 if some deformation of the element occurred during the setting of the slip 14, and simultaneously the backup ring 20 to ride up on the element 26. The pusher, then, continues moving to the inside diameter of the element 26 as shown in FIG. 2. It is to be understood that the element 26 when fully radially displaced and in this position fully radially supported by the pusher 30 is frictionally retained in that position not only by the energy put in to the element by the radial compression between the tubular 18 and the pusher 30 but also by the surface 32 which is textured. This may be done with teeth 33, bumps, roughness, spikes, etc.

It will also be appreciated that the backup ring 20 has moved into contact with the tubular 18 in FIG. 2 as well and being interactive with the angled pusher surface 28 and the element chamfer surface 24, the latter helping the ring 20 move to that position.

Moreover, it is to be appreciated that the pusher 30 is in contact with the cone 16 in the final set position of the system 10. This provides for a solid seat 34 position relative to the set position of the anchor portion of the system 10 facilitating predictable pressure hold when a plug 38 (ball, dart, etc.) is dropped onto seat 34. Once the plug 38 finds seat 34, pressure from surface may be raised to fracture level for further processing in an embodiment.

The configuration as discussed, with the element 26 radially displaced rather than axially compressed like in the prior art, reduces element strain on the order of one magnitude. This is of course highly beneficial both in connection with element longevity and in connection with a greater range of element material options. Further, it is because of the radially displaced nature of the operation of this system that a body lock ring and related structure used in generally similar prior art systems is not required for the present invention. Both cost and complexity are thereby reduced, benefitting the art.

Figure 3:
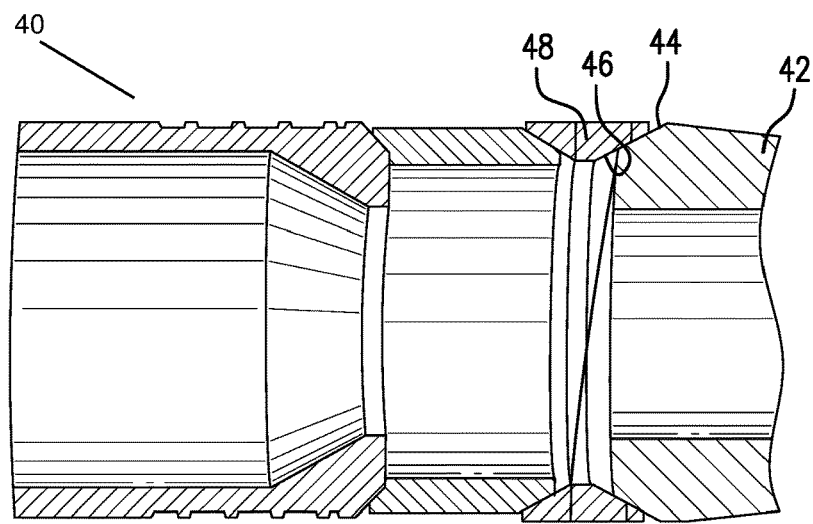
FIG. 3 is a schematic view of the anchor and seal system with an alternate backup ring.
Figure 4:
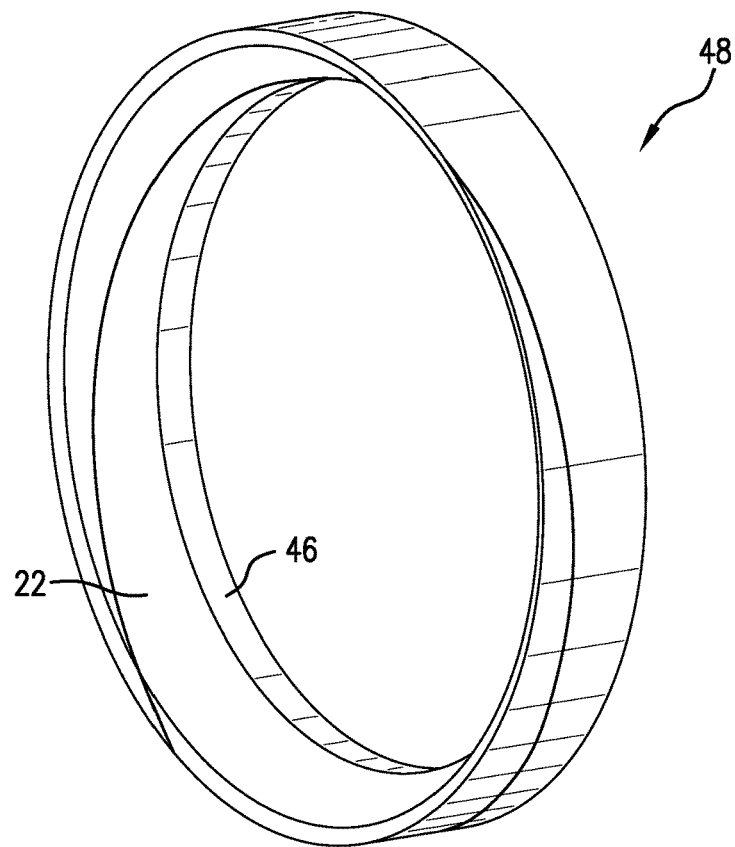
FIG. 4 is a perspective view of the alternate backup ring.

Referring to FIGS. 3 and 4, an alternate embodiment configured to provide easier expansion of the backup ring is illustrated. All components of the system 40 are the same except for those noted. Directing attention to an uphole end of the cone 42, it will be appreciated that a chamfer 44 has been provided. Chamfer 44 is to interact with angle 46 on backup 48 to reduce force needed to expand the backup 48. In FIG. 4, the backup 48 is illustrated in perspective view by itself to show the angle 46 opposing the angled surface 22 utilized in the former backup 20 embodiment. Other than a reduced force requirement for the backup ring expansion in the embodiment of FIGS. 3 and 4, the system works identically for both embodiments.

A borehole system benefits by employing the system 10 therein for various downhole operations. The borehole system includes a tubular string, a part of which is illustrated at 18 and a system 10 disposed therein.

A method for treating a borehole includes running an anchor and seal system 10 as disclosed herein to depth; activating a setting arrangement 36 to anchor and seal the anchor and seal system 10; deploying a plug 38 to land in a seat 34 of the anchor and seal system 10 and pressuring the borehole against the plug 38 in the seat 34 to effect a borehole operation such as a fracturing operation or another setting operation, for example.

Set forth below are some embodiments of the foregoing disclosure:

Embodiment 1

An anchor and seal system including a slip, a cone in radially expanding communication with the slip, an element in loadable communication with the cone, and a pusher configured to radially displace the element to reside on an element retention surface of the pusher.

Embodiment 2

The system as in any prior embodiment wherein the element retention surface is textured.

Embodiment 3

The system as in any prior embodiment wherein the element is polymeric.

Embodiment 4

The system as in any prior embodiment wherein the element is elastomeric.

Embodiment 5

The system as in any prior embodiment further comprising a backup ring at only one axial end of the element.

Embodiment 6

The system as in any prior embodiment wherein the pusher includes an angled pusher surface.

Embodiment 7

The system as in any prior embodiment wherein the element includes an element chamfer surface.

Embodiment 8

The system as in any prior embodiment wherein the pusher further includes a plug seat.

Embodiment 9

The system as in any prior embodiment wherein the cone includes a chamfer.

Embodiment 10

A borehole system including a tubular string, an anchor and seal system including a slip, a cone in radially expanding communication with the slip, an element in loadable communication with the cone, and a pusher configured to radially displace the element to reside on an element retention surface of the pusher.

Embodiment 11

The system as in any prior embodiment further comprising a backup ring at only one axial end of the element.

Embodiment 12

An anchor and seal system including a slip, a cone in radially expanding communication with the slip, an element in loadable communication with the cone, a backup between the cone and the element, and a pusher configured to radially displace the element to reside on an element retention surface of the pusher which presents the element for loaded contact between the pusher and a separate tubular when the element is disposed on the element retention surface.

Embodiment 13

The system as in any prior embodiment wherein the pusher includes a plug seat.

Embodiment 14

A method for treating a borehole including running an anchor and seal system as in any prior embodiment to depth, activating a setting arrangement to anchor and seal the anchor and seal system.

Embodiment 15

The method as in any prior embodiment further including deploying a plug to land in a seat of the anchor and seal system, and pressuring the borehole against the plug in the seat to effect a borehole operation.

Embodiment 16

The method as in any prior embodiment wherein the borehole operation is fracturing.

Embodiment 17

The method as in any prior embodiment wherein the borehole operation is another setting operation.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An anchor and seal system comprising:
a slip;
a cone in radially expanding communication with the slip;
an element in axially loadable but not radially loadable communication with the cone; and
a pusher configured to radially displace the element to reside on an element retention surface of the pusher wherein the pusher further includes a plug seat.

2. An anchor and seal system comprising:
a slip;
a cone in radially expanding communication with the slip;
an element in loadable communication with the cone;
a backup between the cone and the element; and
a pusher configured to radially displace the element to reside on an element retention surface of the pusher which presents the element for loaded contact between the pusher and a separate tubular when the element is disposed on the element retention surface wherein the pusher includes a plug seat.

3. The system as claimed in claim 2 wherein the element retention surface is textured.

4. The system as claimed in claim 2 wherein the element is polymeric.

5. The system as claimed in claim 2 wherein the element is elastomeric.

6. The system as claimed in claim 2 further comprising the backup ring being at only one axial end of the element.

7. The system as claimed in claim 2 wherein the pusher includes an angled pusher surface.

8. The system as claimed in claim 2 wherein the element includes an element chamfer surface.

9. The system as claimed in claim 2 wherein the cone includes a chamfer.

10. The system as claimed in claim 2 further comprising a backup ring at only one axial end of the element.

11. A method for treating a borehole comprising:
running an anchor and seal system to depth, the system comprising
a slip;
a cone in radially expanding communication with the slip;
an element in loadable communication with the cone; and
a pusher configured to radially displace the element to reside on an element retention surface of the pusher, the pusher prior to setting lacking direct contact with the cone and then upon setting having direct contact with the cone;
activating a setting arrangement to anchor and seal the anchor and seal system;
deploying a plug to land in a seat of the anchor and seal system; and pressuring the borehole against the plug in the seat to effect a borehole operation.

12. The method as claimed in claim 11 wherein the borehole operation is fracturing.

13. The method as claimed in claim 11 wherein the borehole operation is another setting operation.

* * * * *